(12) United States Patent
Hsu Liu et al.

(10) Patent No.: US 12,500,866 B2
(45) Date of Patent: Dec. 16, 2025

(54) AUTOMATIC PROXY SYSTEM, AUTOMATIC PROXY METHOD AND NON-TRANSITORY COMPUTER READABLE MEDIUM

(71) Applicant: Fu-Hau Hsu, Taichung (TW)

(72) Inventors: Yim-Mei Hsu Liu, Taipei (TW); Jian Hong Huang, Miaoli County (TW); Shi Xian Huang, Kaohsiung (TW); Jian-Xin Chen, New Taipei (TW); Yi-Cheng Zhu, Yilan County (TW); Chia-Jung Wu, Kaohsiung (TW); Hao-Jyun Wang, Taoyuan (TW)

(73) Assignee: Fu-Hau Hsu, Taichung (TW)

( * ) Notice: Subject to any disclaimer, the term of this patent is extended or adjusted under 35 U.S.C. 154(b) by 294 days.

(21) Appl. No.: 17/819,323

(22) Filed: Aug. 12, 2022

(65) Prior Publication Data
US 2023/0269236 A1    Aug. 24, 2023

(30) Foreign Application Priority Data

Feb. 22, 2022   (TW) .................................. 111106446

(51) Int. Cl.
*H04L 9/40* (2022.01)
*H04L 61/2503* (2022.01)
*H04L 61/4511* (2022.01)

(52) U.S. Cl.
CPC ...... *H04L 63/0281* (2013.01); *H04L 61/2503* (2013.01); *H04L 61/4511* (2022.05); *H04L 63/0236* (2013.01)

(58) Field of Classification Search
None
See application file for complete search history.

(56) References Cited

U.S. PATENT DOCUMENTS

| 6,829,638 | B1 | 12/2004 | McBrearty et al. |
| 10,237,207 | B2 * | 3/2019 | Lee ........................ H04L 49/901 |
| 11,765,088 | B2 * | 9/2023 | Lu ........................ H04L 45/7453 |
|  |  |  | 370/389 |
| 11,863,528 | B1 * | 1/2024 | Chung .................... H04L 69/22 |
| 2012/0066371 | A1 | 3/2012 | Patel et al. |

(Continued)

FOREIGN PATENT DOCUMENTS

CN   113726872 A   * 11/2021   ........... H04L 67/566

OTHER PUBLICATIONS

Meta, facebookincubator katran, retrieved on Aug. 4, 2022 from https://github.com/facebookincubator/katran.

(Continued)

*Primary Examiner* — Younes Naji
(74) *Attorney, Agent, or Firm* — CKC & Partners Co., LLC

(57) ABSTRACT

The present disclosure provides an automatic proxy method includes steps as follows. A controller selects one proxy host as a first designated proxy host from a plurality of proxy hosts and uses the Internet protocol address of the first designated proxy host as an external Internet protocol address of a main server; then, the controller communicates with a domain name system, so that the domain name system can update a record of a mapping between a domain name of the main server and the Internet protocol address of the first designated proxy host.

15 Claims, 5 Drawing Sheets

(56) References Cited

U.S. PATENT DOCUMENTS

| | | | | |
|---|---|---|---|---|
| 2013/0198065 | A1* | 8/2013 | McPherson | H04L 12/1432 |
| | | | | 705/40 |
| 2017/0324847 | A1* | 11/2017 | Good | H04L 47/125 |
| 2018/0007085 | A1* | 1/2018 | Holloway | H04L 63/1458 |
| 2018/0302438 | A1* | 10/2018 | Robertson | H04L 63/20 |
| 2020/0021559 | A1* | 1/2020 | Kish | H04L 61/59 |
| 2020/0322374 | A1 | 10/2020 | Holloway et al. | |
| 2020/0412707 | A1* | 12/2020 | Siefker | H04L 63/101 |

OTHER PUBLICATIONS

Usama Naseer et al., "Zero Downtime Release: Disruption-free Load Balancing of a Multi-Billion User Website", In Annual conference of the ACM Special Interest Group on Data Communication on the applications, technologies, architectures, and protocols for computer communication (SIGCOMM '20), Association for Computing Machinery, New York, NY, USA, pp. 529-541, 2020. https://doi.org/10.1145/3387514.3405885.

Wikipedia, "Linux Virtual Server", retrieved on Aug. 4, 2022 from https://en.wikipedia.org/wiki/Linux_Virtual_Server, ast edited on Nov. 10, 2021.

Alibaba, LVS, retrieved on Aug. 4, 2022 from https://github.com/alibaba/LVS.

* cited by examiner

US 12,500,866 B2

AUTOMATIC PROXY SYSTEM, AUTOMATIC PROXY METHOD AND NON-TRANSITORY COMPUTER READABLE MEDIUM

RELATED APPLICATIONS

This application claims priority to Taiwan Application Serial Number 111106446, filed Feb. 22, 2022, which is herein incorporated by reference.

BACKGROUND

Field of Invention

The present invention relates to systems and methods, and more particularly, automatic proxy systems and automatic proxy methods.

Description of Related Art

A cyberattack is any offensive maneuver that targets computer information systems, computer networks, infrastructures, or personal computer devices. For example, a denial-of-service attack is a cyberattack that aims to exhaust the network or system resources of the target server, thereby temporarily interrupting or stopping the service, so that a normal user cannot access the service.

In view of the foregoing, there still exist some problems on the cyberattack that await further improvement. However, those skilled in the art sought vainly for a solution. Accordingly, there is an urgent need in the related field to avoid or circumvent the cyberattack.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides automatic proxy systems and automatic proxy methods, to solve or circumvent aforesaid problems and disadvantages in the related art.

An embodiment of the present disclosure is related to an automatic proxy system, and the automatic proxy system includes a plurality of proxy hosts and a controller. The controller communicates with the proxy hosts, the controller is configured to select one proxy host as a first designated proxy host from the proxy hosts and to designate an internet protocol (IP) address of the first designated proxy host as an external IP address of a main server, and the controller is configured to communicate with a domain name system (DNS), so that the DNS updates a record of a mapping between a domain name of the main server and the IP address of the first designated proxy host.

In one embodiment of the present disclosure, when a first user device sends a request of querying the domain name of the main server to the DNS, the DNS returns the IP address of the first designated proxy host to the first user device, so that the first user device accesses service on the main server through the first designated proxy host, after the first designated proxy host detects a user packet sent from the first user device, the first designated proxy host dynamically adds an IP address of the first user device to a firewall whitelist.

In one embodiment of the present disclosure, after the first designated proxy host receives the user packet, the first designated proxy host performs a network address translation on the user packet to obtain a translated user packet, so that the translated user packet records the IP address of the first designated proxy host, and the first designated proxy host sends the translated user packet to the main server, so that the main server sends a response message to the first designated proxy host according to the IP address of the first designated proxy host recorded in the translated user packet, and then the designated proxy host forwards the response message to the first user device.

In one embodiment of the present disclosure, after the first designated proxy host suffers a cyberattack and notifies the controller, the controller selects another proxy host as a second designated proxy host from the proxy hosts and designates an IP address of the second designated proxy host as the external IP address of the main server, and the controller communicates with the DNS, so that the DNS updates the record of a mapping between the domain name of the main server and the IP address of the second designated proxy host.

In one embodiment of the present disclosure, after the DNS updates the record of the mapping between the domain name of the main server and the IP address of the second designated proxy host, the first user device continues to access the service on the main server through the first designated proxy host, and when a second user device sends a request of querying the domain name of the main server to the DNS, the DNS returns the IP address of the second designated proxy host to the second user device, so that the second user device accesses the service on the main server through the second designated proxy host.

Another embodiment of the present disclosure is related to an automatic proxy method, and the automatic proxy method includes steps of: using a controller to select one proxy host as a first designated proxy host from a plurality of proxy hosts and to designate an IP address of the first designated proxy host as an external IP address of a main server; using the controller to communicate with a DNS, so that the DNS updates a record of a mapping between a domain name of the main server and the IP address of the first designated proxy host.

In one embodiment of the present disclosure, the automatic proxy method further includes steps of: when a first user device sends a request of querying the domain name of the main server to the DNS, returning the IP address of the first designated proxy host to the first user device through the DNS, so that the first user device accesses service on the main server through the first designated proxy host; after the first designated proxy host detects a user packet sent from the first user device, using the first designated proxy host to dynamically add an IP address of the first user device to a firewall whitelist.

In one embodiment of the present disclosure, the automatic proxy method further includes steps of: after the first designated proxy host receives the user packet, using the first designated proxy host to perform a network address translation on the user packet to obtain a translated user packet, so that the translated user packet records the IP address of the first designated proxy host; using the first designated proxy host to send the translated user packet to the main server, so that the main server sends a response message to the first designated proxy host according to the IP address of the first designated proxy host recorded in the translated user packet, and then the designated proxy host forwards the response message to the first user device.

In one embodiment of the present disclosure, the automatic proxy method further includes steps of: after the first designated proxy host suffers a cyberattack and notifies the controller, using the controller to select another proxy host as a second designated proxy host from the proxy hosts and to designate an IP address of the second designated proxy host as the external IP address of the main server; using the controller communicates with the DNS, so that the DNS updates the record of a mapping between the domain name of the main server and the IP address of the second designated proxy host.

In one embodiment of the present disclosure, the automatic proxy method further includes steps of: after the DNS updates the record of the mapping between the domain name of the main server and the IP address of the second designated proxy host, allowing the first user device to continue to access the service on the main server through the first designated proxy host, and when a second user device sends a request of querying the domain name of the main server to the DNS, returning the IP address of the second designated proxy host to the second user device through the DNS, so that the second user device accesses the service on the main server through the second designated proxy host.

Yet another embodiment of the present disclosure is related to a non-transitory computer readable medium to store a plurality of instructions for commanding a computer to execute an automatic proxy method, and the automatic proxy method includes steps of: using a controller to select one proxy host as a first designated proxy host from a plurality of proxy hosts and to designate an IP address of the first designated proxy host as an external IP address of a main server; using the controller to communicate with a DNS, so that the DNS updates a record of a mapping between a domain name of the main server and the IP address of the first designated proxy host.

In view of the above, through the automatic proxy system and the automatic proxy method of the present disclosure, the server can avoid the cyberattack effectively.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
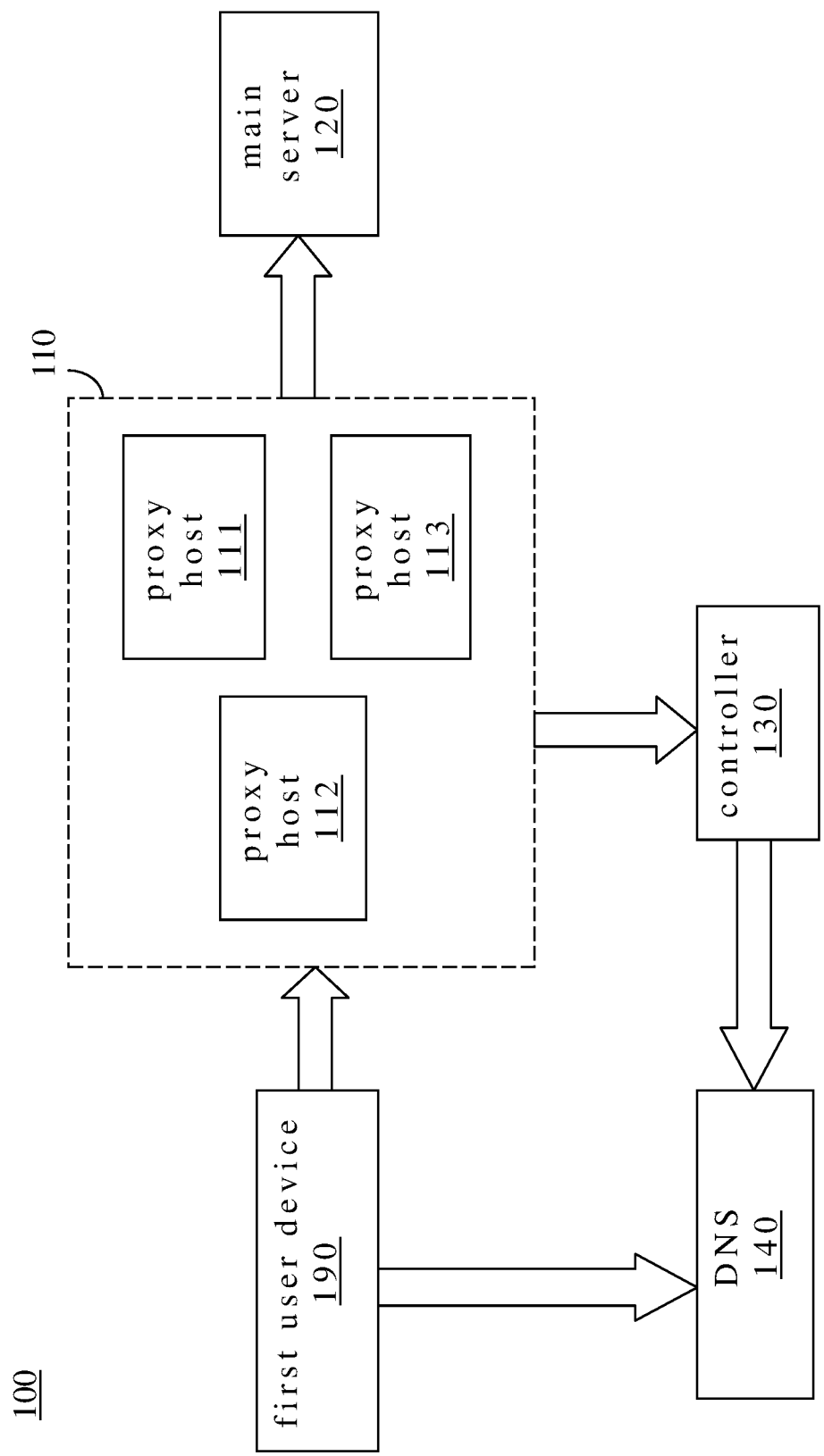
FIG. 1 is a block diagram of an automatic proxy system in a normal usage scenario according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
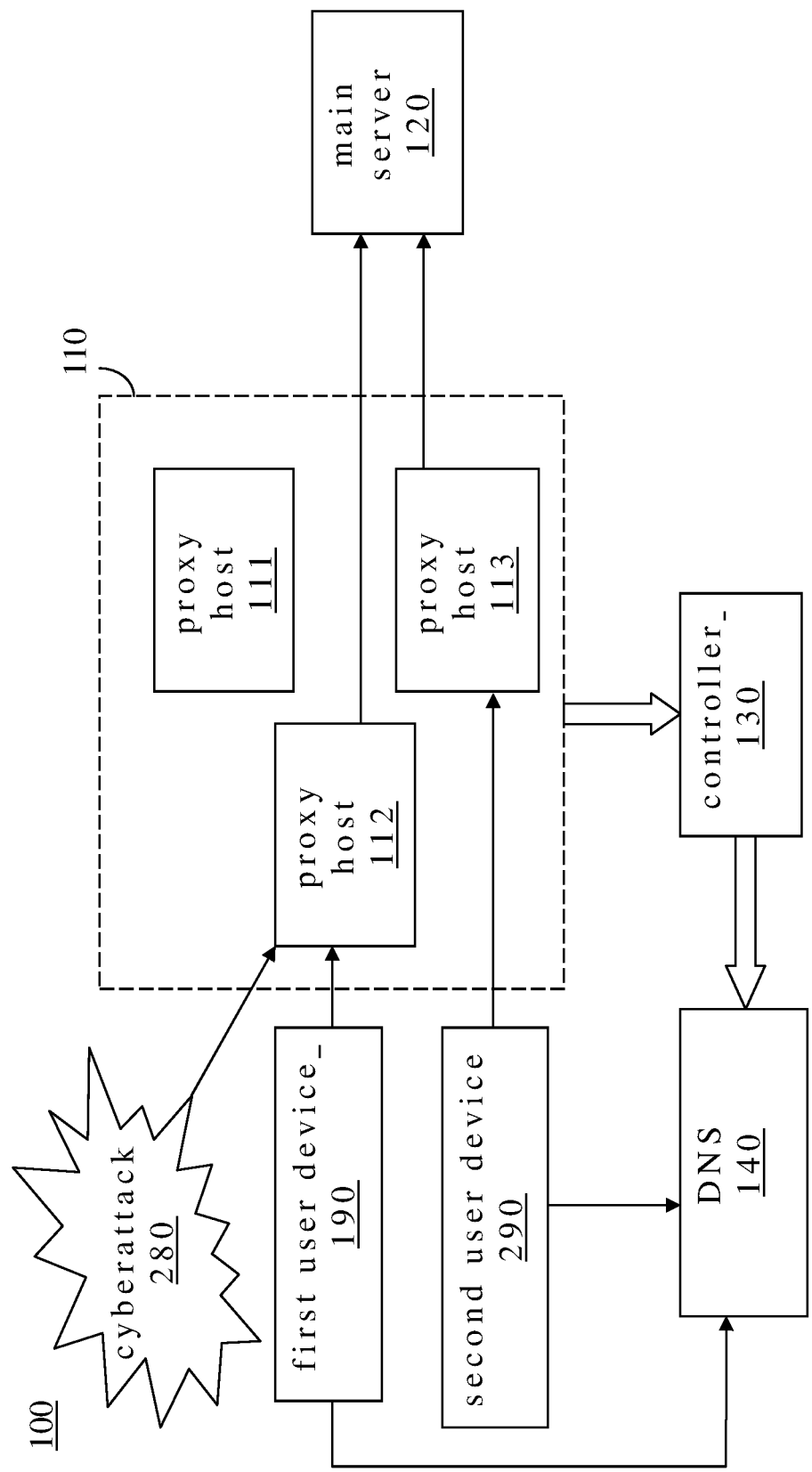
FIG. 2 is a block diagram of an automatic proxy system in an attack scenario according to some embodiments of the present disclosure.

Referring to FIG. 1 and FIG. 2, in one aspect, the present disclosure is directed to an automatic proxy system 100. This system may be easily integrated into a computer and may be applicable or readily adaptable to all technologies. Accordingly, the automatic proxy system 100 has advantages. Herewith the automatic proxy system 100 is described below with FIG. 1 and FIG. 2.

The subject disclosure provides the automatic proxy system 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a block diagram of the automatic proxy system 100 in a normal usage scenario according to some embodiments of the present disclosure. As shown in FIG. 1, the automatic proxy system 100 includes a proxy host group 110 and a controller 130. In structure, the proxy host group 110 communicates with the controller 130. It should be noted that when an element is referred to "communicate" with another element, it can be directly connected or coupled to the other element or intervening elements may be present. For example, the proxy host group 110 may be indirectly connected to the controller 130 through the wired and/or wireless communication, or the proxy host group 110 may be physically connected to the controller 130 without another element.

In FIG. 1, the proxy host group 110 includes a proxy host 111, a proxy host 112 and a proxy host 113. In practice, for example, each of the proxy hosts 111, 112 and 113 can be a computer host or similar hardware, and the controller 130 can be a computer device, control equipment or a similar device. In addition, the main server 120 is a server that mainly provides services (e.g., a website server, etc.).

In the deployment environment of the automatic proxy system 100, the controller 130 communicates with the proxy hosts 111, 112 and 113. The controller 130 is configured to select one proxy host as a first designated proxy host (e.g., the proxy host 112) from the proxy hosts 111, 112 and 113 and to designate an internet protocol (IP) address of the first designated proxy host (e.g., the proxy host 112) as an external IP address of a main server 120. Then, the controller 130 is configured to communicate with a domain name system (DNS) 140 (e.g., a DNS server), so that the DNS 140 can update a record of a mapping between a domain name of the main server 120 and the IP address of the first designated proxy host (e.g., the proxy host 112). In this way, the real IP address of the main server 120 is not exposed.

Referring to FIG. 1, in the normal usage scenario, a user tries to input the domain name (e.g., URL) of the main server 120 in a first user device 190 to access the service on the main server 120 through the network, in one embodiment of the present disclosure, when the first user device 190 sends a request of querying the domain name of the main server 120 to the DNS 140, the DNS 140 returns the IP address of the first designated proxy host (e.g., the proxy host 112) to the first user device 190, so that the first user device 190 can access the service on the main server 120 through the first designated proxy host (e.g., the proxy host 112).

Moreover, in one embodiment of the present disclosure, after the first designated proxy host (e.g., the proxy host 112) detects a user packet sent from the first user device 190, the first designated proxy host (e.g., the proxy host 112) dynamically adds an IP address of the first user device 190 to a firewall whitelist.

In practice, for example, the first designated proxy host (e.g., the proxy host 112) can execute a bloom filter to authenticate whether the new connection is a normal user. After the normal user requests to connect to the main server 120 through the first user device 190, since the DNS 140 has recorded that the external IP address of the main server 120 is mapped to the IP address of the first designated proxy host (e.g., the proxy host 112), when the first user device 190 does not receive a packet responded from the main server 120, the first user device 190 repeatedly sends the same packet to the first designated proxy host (e.g., the proxy host 112). The bloom filter can assist in quick marking/querying, so that the normal user can pass the authentication; for example, when the first user device 190 of the user enters the first designated proxy host (e.g., the proxy host 112) for the first time, the first designated proxy host (e.g., the proxy host 112) put the source IP address and the source port of the user packet (e.g., a packet of a request connection) into the marker point of the bloom filter. Then, when the first user device 190 of the user sends the same user packet to the first designated proxy host (e.g., the proxy host 112) again, the first designated proxy host (e.g., the proxy host 112) checks the marker point correspondingly. When the source IP address and source port of the resent user packet match the source IP address and source recorded in the marker point, the first designated proxy host (e.g., the proxy host 112) determines that the first user device 190 passes the authentication, and therefore the first designated proxy host (e.g., the proxy host 112) dynamically adds the IP address of the first user device 190 to the firewall whitelist.

Alternatively or additionally, in practice, for example, after the first designated proxy host (e.g., the proxy host 112) determines that the first user device 190 has passed the authentication, the first designated proxy host (e.g., the proxy host 112) sends a packet of approving the request connection to the first user device 190, so that the first user device 190 can send an acknowledge packet to the first designated proxy host (e.g., the proxy host 112). Thus, the first designated proxy host (e.g., the proxy host 112) the first user device 190 complete a handshake authentication firstly. Then, the first designated proxy host (e.g., the proxy host 112) sends a packet of the request connection to the main server 120, and the main server 120 sends a packet of approving the request connection to the first designated proxy host (e.g., the proxy host 112), so that the first designated proxy host (e.g., the proxy host 112) can send an acknowledge packet to the main server 120. Thus, the first designated proxy host (e.g., the proxy host 112) and the main server 120 complete the handshake authentication. Then, the first user device 190 accesses the service on the main server 120 through the first designated proxy host (e.g., the proxy host 112). In this way, when the cyberattacks continue to occur, the first designated proxy host (e.g., the proxy host 112) activates the aforementioned mechanism to protect the security of the main server 120.

In the normal usage scenario, in one embodiment of the present disclosure, after the first designated proxy host (e.g., the proxy host 112) receives the user packet, the first designated proxy host (e.g., the proxy host 112) performs a network address translation on the user packet to obtain a translated user packet, so that the translated user packet records the IP address of the first designated proxy host (e.g., the proxy host 112), and the first designated proxy host (e.g., the proxy host 112) sends the translated user packet to the main server 120, so that the main server 120 can send a response message to the first designated proxy host (e.g., the proxy host 112) according to the IP address of the first designated proxy host (e.g., the proxy host 112) recorded in the translated user packet, and then the designated proxy host (e.g., the proxy host 112) forwards the response message to the first user device 190.

In practice, for example, the above-mentioned response message can be a response packet, and the main server 120 sends the response packet to the first designated proxy host (e.g., the proxy host 112) firstly, and the first designated proxy host (e.g., the proxy host 112) performs the network address translation on the response packet to obtain a translated response packet, so that the translated response packet records the IP address of the first designated proxy host (e.g., the proxy host 112), and the first designated proxy host (e.g., the proxy host 112) sends the translated response packet to the first user device 190. Therefore, the first user device 190 cannot know the real IP address of the main server 120.

Since the automatic proxy system 100 designates the IP address of the first designated proxy host (e.g., the proxy host 112) as the external IP address of the main server 120, a normal user and/or a hacker cannot obtain the real IP address of the main server 120. Even if the hacker launches the cyberattack, the cyberattack will attack the first designated proxy host (e.g., the proxy host 112) by mistake, so that the server 120 can avoid the cyberattack.

FIG. 2 is a block diagram of the automatic proxy system 100 in an attack scenario according to some embodiments of the present disclosure. As shown in FIG. 2, the first designated proxy host (e.g., the proxy host 112) suffers a cyberattack 280.

In the attack scenario, in one embodiment of the present disclosure, after the first designated proxy host (e.g., the proxy host 112) suffers the cyberattack 280 and notifies the controller 130, the controller 130 selects another proxy host as a second designated proxy host (e.g., the proxy host 113) from the proxy hosts 111, 112 and 113 and designates an IP address of the second designated proxy host (e.g., the proxy host 113) as the external IP address of the main server 120. The controller 130 communicates with the DNS 140, so that the DNS 140 updates the record of a mapping between the domain name of the main server 120 and the IP address of the second designated proxy host (e.g., the proxy host 113).

In one embodiment of the present disclosure, after the DNS 140 updates the record of the mapping between the domain name of the main server 120 and the IP address of the second designated proxy host (e.g., the proxy host 113), the first user device 190 of the original user is not affected by the cyberattack 280, and the first user device 190 continues to access the service on the main server 120 through the first designated proxy host (e.g., the proxy host 112). In practice, for example, the first designated proxy host (e.g., the proxy host 112) can allow the first user device 190 to continue to use the first designated proxy host (e.g., the proxy host 112) to access the service on the main server according to the above-mentioned firewall whitelist.

In practice, for example, the cyberattack 280 usually sends an attack packet through a different forged IP address at every turn, and the cyberattack 280 does not sends the attack packets through the same forged IP address repeatedly. However, a normal user packet is repeatedly sent once or twice. The first designated proxy host (e.g., the proxy host 112) can execute the above-mentioned bloom filter to add the IP address of the first user device 190 to the above-mentioned firewall whitelist when the first user device 190 sends repeated user packets, so as to quickly filter out non-repetitive attack packets. In this way, when the first designated proxy host (e.g., the proxy host 112) suffers the cyberattack 280, the first user device 190 normally accesses the service on the main server 120 through the first designated proxy host (e.g., the proxy host 112).

After the DNS 140 updates the record of the mapping between the domain name of the main server 120 and the IP address of the second designated proxy host (e.g., the proxy host 113), a user tries to input the domain name (e.g., URL) of the main server 120 in a second user device 290 to access the service on the main server 120 through the network, in one embodiment of the present disclosure, when the second user device 290 sends a request of querying the domain name of the main server 120 to the DNS 140, the DNS 140 returns the IP address of the second designated proxy host (e.g., the proxy host 113) to the second user device 290, so that the second user device 290 can access the service on the main server 120 through the second designated proxy host (e.g., the proxy host 113).

In a control experiment, the proxy host group 110 and the controller 130 are omitted, the number of the main servers 120 is set to multiple, and the multiple main servers perform data synchronization with each other. When one main server suffers the cyberattack, a next main server provides service. However, when any of the main servers in this control experiment suffers the cyberattack, errors or omissions in data synchronization occur usually, resulting in problems or interruptions in the services of the above-mentioned next main server.

In a control experiment, the proxy host group 110 and the controller 130 are omitted, the DNS 140 records the mapping between the domain name of the main server 120 and the real IP address of the main server 120, and a user manually sets that a user device is connected to the main server 120 through a traditional proxy server. However, the hacker can easily obtain the real IP address of the main server 120 through the DNS 140 in this control experiment, and therefore the main server 120 may suffer the cyberattack directly.

Figure 3:
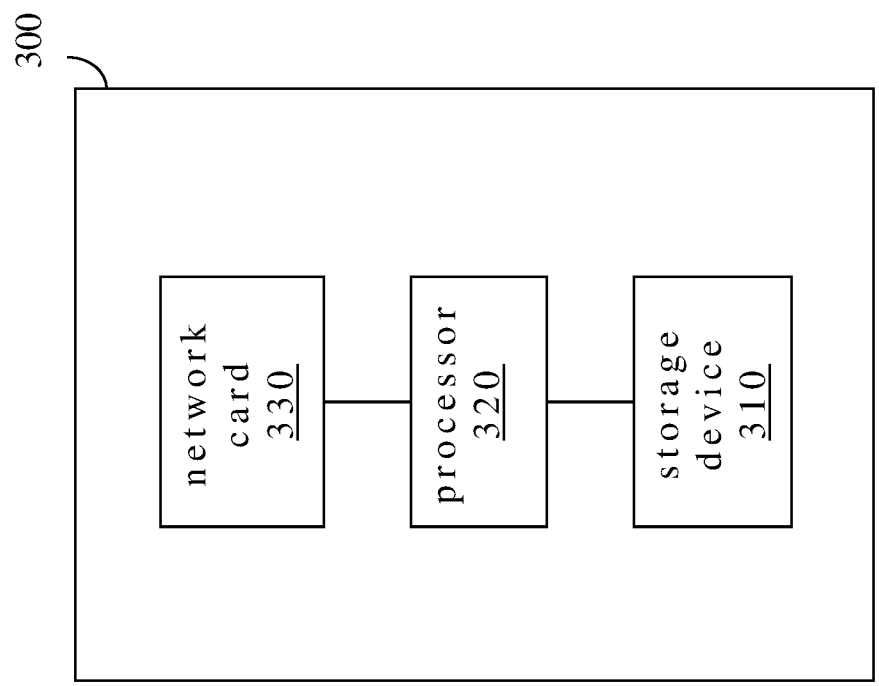
FIG. 3 is a block diagram of a proxy host according to some embodiments of the present disclosure.

For a more complete understanding of each of the proxy hosts 111, 112 and 113 for quickly processing packets, refer to FIG. 3. FIG. 3 is a block diagram of a proxy host 300 according to some embodiments of the present disclosure. In practice, for example, the architecture of the proxy host 300 may be applicable to any one of the proxy hosts 111, 112 and 113 (e.g., the first designated proxy host, the second designated proxy host, etc.).

As shown in FIG. 3, the proxy host 300 includes a storage device 310, a processor 320 and a network card 330. For example, the storage device 310 may be a hard disk, a flash storage device or other storage medium, and the processor 320 may be a central processing unit, a microcontroller or other circuits.

In structure, the storage device 310 is electrically connected to the processor 320, and the processor 320 is electrically connected to the network card 330. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the storage device 310 may be a built-in storage device that is directly connected to the processor 320, or the storage device 310 may be an external storage device that is indirectly connected to the processor 320 through the connection device.

In practice, for example, the storage device 310 stores an operating system (e.g., a Linux operating system or another operating system) and a data plane development kit (DPDK), and the processor 320 executes the DPDK to enable the kernel of the operating system for actively polling the network card 330 whether receiving packets or not, so as to quickly process the packets.

In a control experiment, the DPDK is omitted, when the network card 330 receives the packet, the network card 330 sends a notification signal to the kernel of the operating system, and the kernel of the operating system passively receives data of the packet from the network card 330. However, the process of processing packets in this control experiment is slow.

Referring to FIG. 2 and FIG. 3, in practice, for example, the architecture of the proxy host 300 is applied to the first designated proxy host (e.g., the proxy host 112), so that the first designated proxy host (e.g., the proxy host 112) can quickly process the packets. When the first designated proxy host (e.g., the proxy host 112) suffers the cyberattack 280, the DPDK is used to quickly process the packets, thereby accelerating the above manner of filtering out the attack packets.

Figure 4:
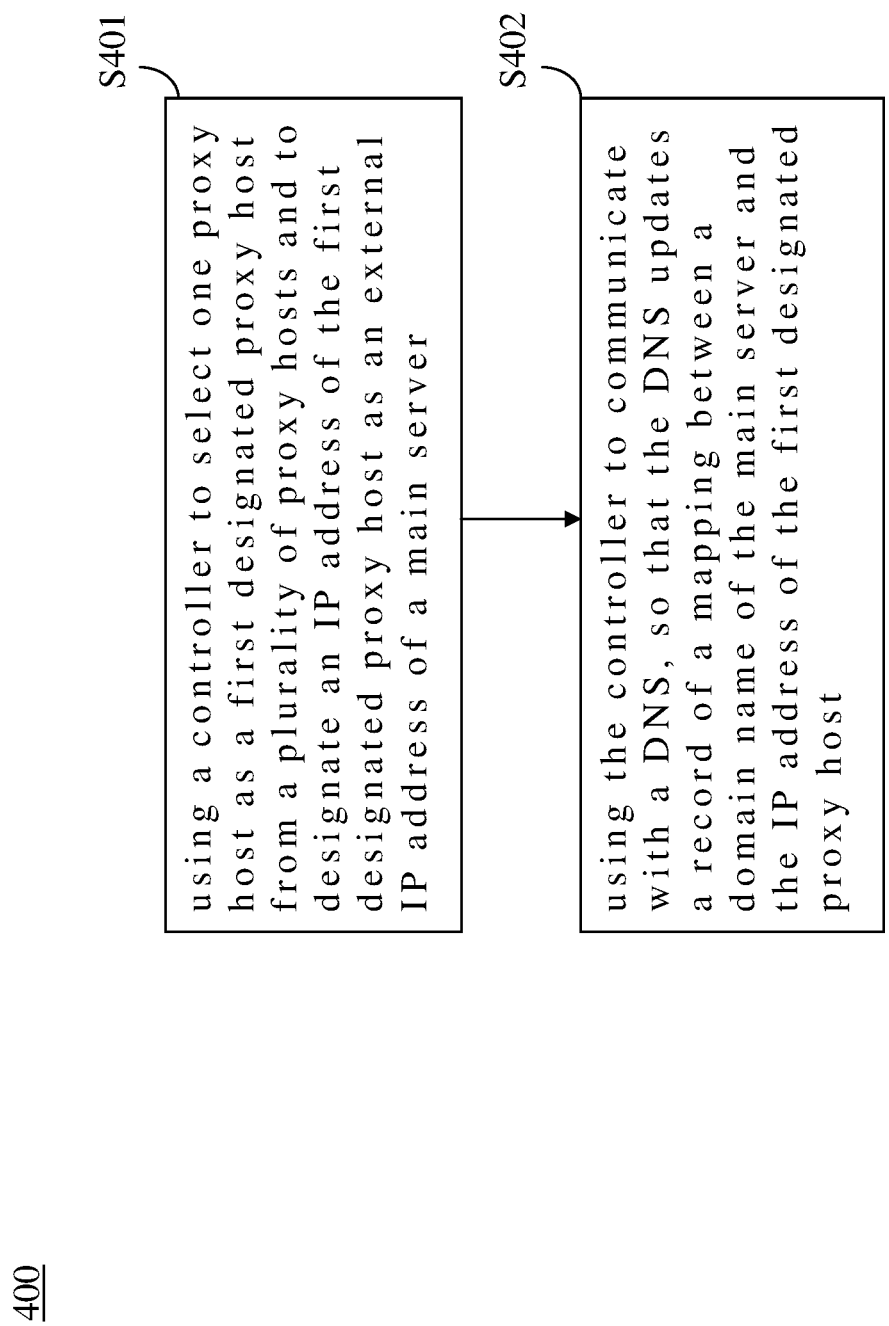
FIG. 4 is a flow chart of an automatic proxy method according to some embodiments of the present disclosure.

For a more complete understanding of an automatic proxy method performed by the automatic proxy system 100, referring FIGS. 1-4, FIG. 4 is a flow chart of an automatic proxy method 400 according to some embodiments of the present disclosure. As shown in FIG. 4, the automatic proxy method 400 includes operations S401 and S402. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

The automatic proxy method 400 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In operation S401, the controller 130 is used to select one proxy host as a first designated proxy host (e.g., the proxy host 112) from the proxy hosts 111, 112 and 113 and to designate an IP address of the first designated proxy host (e.g., the proxy host 112) as an external IP address of a main server 120. In operation S402, the controller 130 is used to communicate with the DNS 140, so that the DNS 140 can update a record of a mapping between a domain name of the main server 120 and the IP address of the first designated proxy host (e.g., the proxy host 112). In this way, the real IP address of the main server 120 is not exposed.

In one embodiment of the present disclosure, the automatic proxy method 400 further includes operations as follows. When the first user device 190 sends a request of querying the domain name of the main server 120 to the DNS 140, the DNS 140 returns the IP address of the first designated proxy host (e.g., the proxy host 112) to the first user device 190, so that the first user device 190 can access the service on the main server 120 through the first designated proxy host (e.g., the proxy host 112). After the first designated proxy host (e.g., the proxy host 112) detects a user packet sent from the first user device 190, the first designated proxy host (e.g., the proxy host 112) dynamically adds an IP address of the first user device 190 to a firewall whitelist.

In one embodiment of the present disclosure, the automatic proxy method 400 further includes operations as follows. After the first designated proxy host (e.g., the proxy host 112) receives the user packet, the first designated proxy host (e.g., the proxy host 112) performs a network address translation on the user packet to obtain a translated user packet, so that the translated user packet records the IP address of the first designated proxy host (e.g., the proxy host 112), and the first designated proxy host (e.g., the proxy host 112) sends the translated user packet to the main server 120, so that the main server 120 can send a response message to the first designated proxy host (e.g., the proxy host 112) according to the IP address of the first designated proxy host (e.g., the proxy host 112) recorded in the translated user packet, and then the designated proxy host (e.g., the proxy host 112) forwards the response message to the first user device 190.

In one embodiment of the present disclosure, the automatic proxy method 400 further includes operations as follows. After the first designated proxy host (e.g., the proxy host 112) suffers the cyberattack 280 and notifies the controller 130, the controller 130 selects another proxy host as a second designated proxy host (e.g., the proxy host 113) from the proxy hosts 111, 112 and 113 and designates an IP address of the second designated proxy host (e.g., the proxy host 113) as the external IP address of the main server 120. The controller 130 communicates with the DNS 140, so that the DNS 140 updates the record of a mapping between the domain name of the main server 120 and the IP address of the second designated proxy host (e.g., the proxy host 113).

In one embodiment of the present disclosure, the automatic proxy method 400 further includes operations as follows. After the DNS 140 updates the record of the mapping between the domain name of the main server 120 and the IP address of the second designated proxy host (e.g., the proxy host 113), the first user device 190 of the original user is allowed to continue to access the service on the main server 120 through the first designated proxy host (e.g., the proxy host 112). When the second user device 290 sends a request of querying the domain name of the main server 120 to the DNS 140, the DNS 140 returns the IP address of the second designated proxy host (e.g., the proxy host 113) to the second user device 290, so that the second user device 290 can access the service on the main server 120 through the second designated proxy host (e.g., the proxy host 113).

Figure 5:
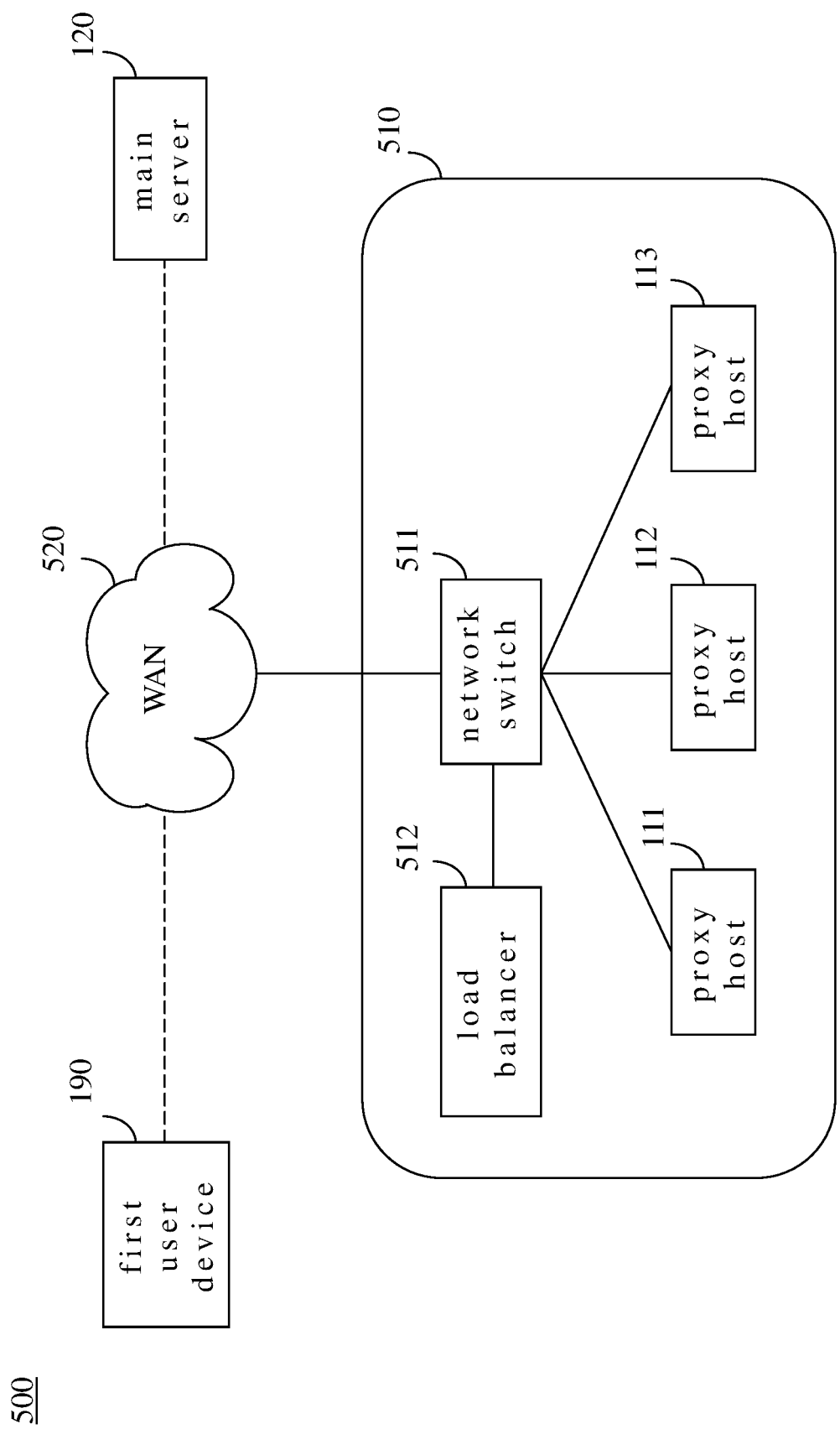
FIG. 5 is a block diagram of an automatic proxy system according to some embodiments of the present disclosure.

FIG. 5 is a block diagram of an automatic proxy system 500 according to some embodiments of the present disclosure. In FIG. 5, the proxy host group 510 includes a network switch 511, a load balancer 512 (e.g., a computer host) and the proxy hosts 111, 112 and 113. In structure, the network switch 511 communicates with a wide area network (WAN) 520, the network switch 511 is electrically connected to the load balancer 512 and the proxy hosts 111, 112 and 113, so that the load balancer 512 and the proxy hosts 111, 112 and 113 can be in the same network domain through the network switch 511.

In one embodiment of the present disclosure, the automatic proxy method 400 further includes operations as follows. When the first user device 190 sends a first packet (e.g., a user packet) to the load balancer 512 through the wide area network 520 and the network switch 511, and the load balancer 512 transmits the packet to a selected proxy host 112 of the proxy hosts 111, 112 and 113 through the network switch 511. For example, the load balancer 512 may randomly select the proxy host 111 from the proxy hosts 111, 112 and 113, or may designate the proxy host 111 as the selected proxy host 112 depending on a predetermined rule. Then, the selected proxy host 111 changes a source IP address of the first packet from an IP address of the first user device 190 to an IP address of the selected proxy host 111 and changes a destination IP address of the first packet from an IP address of the load balancer 512 to an IP address of the main server 120 so as to create a changed first packet. Then, the selected proxy host 111 sends the changed first packet to the main server 120 through the network switch 511 and the wide area network 520. Then, the main server 120 sends a second packet (e.g., a response packet) to the selected proxy host 111 through the wide area network 520 and the network switch 511. Then, the selected proxy host 111 changes a source IP address of the second packet from the IP address of the main server 120 to the IP address of the load balancer 512 and changes a destination IP address of the second packet from the IP address of the selected proxy host 111 to the IP address of the first user device 190 so as to create a changed second packet. Then, the selected proxy host 111 sends the changed second packet to the first user device 190 through the network switch 511 and the wide area network 520. In this way, the IP address of the load balancer 512 can act as the external IP address of the main server 120, and thus, a normal user and/or a hacker cannot obtain the real IP address of the main server 120.

In view of the above, according to the present disclosure, through the automatic proxy system 100 and the automatic proxy method 400 of the present disclosure, the main server 120 can avoid the cyberattack effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An automatic proxy system, comprising:
a domain name system (DNS);
a plurality of proxy hosts, wherein each of the proxy hosts is a hardware; and
a controller communicating with the proxy hosts, the controller configured to select one proxy host as a first designated proxy host from the proxy hosts and to designate an internet protocol (IP) address of the first designated proxy host as an external IP address of a main server, the main server configured to provide services, and the controller configured to communicate with the DNS to make the DNS update a record of a mapping between a domain name of the main server and the IP address of the first designated proxy host for avoiding a real IP address of the main server being exposed, wherein the controller is a computer, wherein the DNS returns the IP address of the first designated proxy host to a first user device in response to that the first user device sends a request of querying the domain name of the main server to the DNS, the first designated proxy host puts an IP address and a port of a user packet into a marker point of a bloom filter in response to that the first user device enters the first designated proxy host firstly, the first designated proxy host checks the marker point in response to that the first user device sends a repeated user packet to the first designated proxy host again, and the first designated proxy host dynamically adds the IP address of the first user device to a firewall whitelist in response to that the IP address and the port of the repeated user packet match the IP address and the port recorded in the marker point, to filter out non-repetitive attack packets.

2. The automatic proxy system of claim 1, wherein after the first designated proxy host receives the user packet, the first designated proxy host performs a network address translation on the user packet to obtain a translated user packet, so that the translated user packet records the IP address of the first designated proxy host, and the first designated proxy host sends the translated user packet to the main server, so that the main server sends a response message to the first designated proxy host according to the IP address of the first designated proxy host recorded in the translated user packet, and then the designated proxy host forwards the response message to the first user device.

3. The automatic proxy system of claim 1, wherein after the first designated proxy host suffers a cyberattack and notifies the controller, the controller selects another proxy host as a second designated proxy host from the proxy hosts and designates an IP address of the second designated proxy host as the external IP address of the main server, and the controller communicates with the DNS, wherein the DNS updates the record of a mapping between the domain name of the main server and the IP address of the second designated proxy host.

4. The automatic proxy system of claim 3, wherein after the DNS updates the record of the mapping between the domain name of the main server and the IP address of the second designated proxy host, the first user device continues to access the service on the main server through the first designated proxy host, and when a second user device sends a request of querying the domain name of the main server to the DNS, the DNS returns the IP address of the second designated proxy host to the second user device, so that the second user device accesses the service on the main server through the second designated proxy host.

5. The automatic proxy system of claim 1, further comprising:
a network switch electrically connected to the proxy hosts, and the network switch communicating with a wide area network, wherein the network switch is a hardware; and
a load balancer electrically connected to the network switch, wherein the load balancer is a computer, when the first user device sends a first packet to the load balancer through the wide area network and the network switch, the load balancer transmits the first packet to a selected proxy host of the proxy hosts through the network switch, the selected proxy host changes a source IP address of the first packet from an IP address of the first user device to an IP address of the selected proxy host and changes a destination IP address of the first packet from an IP address of the load balancer to an IP address of the main server to create a changed first packet, the selected proxy host sends the changed first packet to the main server through the network switch and the wide area network, the main server sends a second packet to the selected proxy host through the wide area network and the network switch, the selected proxy host changes a source IP address of the second packet from the IP address of the main server to the IP address of the load balancer and changes a destination IP address of the second packet from the IP address of the selected proxy host to the IP address of the first user device to create a changed second packet, the selected proxy host sends the changed second packet to the first user device through the network switch and the wide area network.

6. An automatic proxy method, comprising:
using a controller to select one proxy host as a first designated proxy host from a plurality of proxy hosts and to designate an internet protocol (IP) address of the first designated proxy host as an external IP address of a main server, wherein the main server is configured to provide services;
using the controller to communicate with a domain name system (DNS) to make the DNS update a record of a mapping between a domain name of the main server and the IP address of the first designated proxy host for avoiding a real IP address of the main server being exposed;
using the DNS to returns the IP address of the first designated proxy host to a first user device through the DNS in response to that the first user device sends a request of querying the domain name of the main server to the DNS:
using the first designated proxy host to puts an IP address and a port of a user packet into a marker point of a bloom filter in response to that the first user device enters the first designated proxy host firstly, the first designated proxy host checks the marker point in response to that the first user device sends a repeated user packet to the first designated proxy host again; and
using the first designated proxy host to dynamically add the IP address of the first user device to a firewall whitelist in response to that the IP address and the port of the repeated user packet match the IP address and the port recorded in the marker point, to filter out non-repetitive attack packets.

7. The automatic proxy method of claim 6, further comprising:
after the first designated proxy host receives the user packet, using the first designated proxy host to perform a network address translation on the user packet to obtain a translated user packet, so that the translated user packet records the IP address of the first designated proxy host; and
using the first designated proxy host to send the translated user packet to the main server, so that the main server sends a response message to the first designated proxy host according to the IP address of the first designated proxy host recorded in the translated user packet, and then the designated proxy host forwards the response message to the first user device.

8. The automatic proxy method of claim 6, further comprising:
after the first designated proxy host suffers a cyberattack and notifies the controller, using the controller to select another proxy host as a second designated proxy host from the proxy hosts and to designate an IP address of the second designated proxy host as the external IP address of the main server; and using the controller communicates with the DNS, wherein the DNS updates the record of a mapping between the domain name of the main server and the IP address of the second designated proxy host.

9. The automatic proxy method of claim 8, further comprising:

after the DNS updates the record of the mapping between the domain name of the main server and the IP address of the second designated proxy host, allowing the first user device to continue to access the service on the main server through the first designated proxy host, and when a second user device sends a request of querying the domain name of the main server to the DNS, returning the IP address of the second designated proxy host to the second user device through the DNS, so that the second user device accesses the service on the main server through the second designated proxy host.

10. The automatic proxy method of claim 6, wherein a network switch is electrically connected to the proxy hosts and a load balancer, the network switch communicates with a wide area network, and the automatic proxy method further comprises:

When the first user device sends a first packet to the load balancer through the wide area network and the network switch, using the load balancer to transmit the first packet to a selected proxy host of the proxy hosts through the network switch;

using the selected proxy host to change a source IP address of the first packet from an IP address of the first user device to an IP address of the selected proxy host and to change a destination IP address of the first packet from an IP address of the load balancer to an IP address of the main server to create a changed first packet;

using the selected proxy host to send the changed first packet to the main server through the network switch and the wide area network;

using the main server to send a second packet to the selected proxy host through the wide area network and the network switch;

using the selected proxy host to change a source IP address of the second packet from the IP address of the main server to the IP address of the load balancer and to change a destination IP address of the second packet from the IP address of the selected proxy host to the IP address of the first user device to create a changed second packet; and using the selected proxy host to send the changed second packet to the first user device through the network switch and the wide area network.

11. A non-transitory computer readable medium to store a plurality of instructions for commanding a computer to execute an automatic proxy method, and the automatic proxy method comprising:

using a controller to select one proxy host as a first designated proxy host from a plurality of proxy hosts and to designate an internet protocol (IP) address of the first designated proxy host as an external IP address of a main server, wherein the main server is configured to provide services;

using the controller to communicate with a domain name system (DNS) to make the DNS update a record of a mapping between a domain name of the main server and the IP address of the first designated proxy host for avoiding a real IP address of the main server being exposed;

using the DNS to return the IP address of the first designated proxy host to a first user device through the DNS in response to that the first user device sends a request of querying the domain name of the main server to the DNS;

using the first designated proxy host to put an IP address and a port of a user packet into a marker point of a bloom filter in response to that the first user device enters the first designated proxy host firstly, the first designated proxy host checks the marker point in response to that the first user device sends a repeated user packet to the first designated proxy host again; and using the first designated proxy host to dynamically add the IP address of the first user device to a firewall whitelist in response to that the IP address and the port of the repeated user packet match the IP address and the port recorded in the marker point, to filter out non-repetitive attack packets.

12. The non-transitory computer readable medium of claim 11, wherein the automatic proxy method further comprises:

after the first designated proxy host receives the user packet, using the first designated proxy host to perform a network address translation on the user packet to obtain a translated user packet, so that the translated user packet records the IP address of the first designated proxy host; and using the first designated proxy host to send the translated user packet to the main server, so that the main server sends a response message to the first designated proxy host according to the IP address of the first designated proxy host recorded in the translated user packet, and then the designated proxy host forwards the response message to the first user device.

13. The non-transitory computer readable medium of claim 11, wherein the automatic proxy method further comprises:

after the first designated proxy host suffers a cyberattack and notifies the controller, using the controller to select another proxy host as a second designated proxy host from the proxy hosts and to designate an IP address of the second designated proxy host as the external IP address of the main server; and using the controller communicates with the DNS, wherein the DNS updates the record of a mapping between the domain name of the main server and the IP address of the second designated proxy host.

14. The non-transitory computer readable medium of claim 13, wherein the method further comprises:

after the DNS updates the record of the mapping between the domain name of the main server and the IP address of the second designated proxy host, allowing the first user device to continue to access the service on the main server through the first designated proxy host, and when a second user device sends a request of querying the domain name of the main server to the DNS, returning the IP address of the second designated proxy host to the second user device through the DNS, so that the second user device accesses the service on the main server through the second designated proxy host.

15. The non-transitory computer readable medium of claim 11, wherein a network switch is electrically connected to the proxy hosts and a load balancer, the network switch communicates with a wide area network, and the automatic proxy method further comprises:

when the first user device sends a first packet to the load balancer through the wide area network and the network switch, using the load balancer to transmit the first packet to a selected proxy host of the proxy hosts through the network switch;

using the selected proxy host to change a source IP address of the first packet from an IP address of the first user device to an IP address of the selected proxy host and to change a destination IP address of the first packet from an IP address of the load balancer to an IP address of the main server to create a changed first packet;

using the selected proxy host to send the changed first packet to the main server through the network switch and the wide area network;

using the main server to send a second packet to the selected proxy host through the wide area network and the network switch; using the selected proxy host to change a source IP address of the second packet from the IP address of the main server to the IP address of the load balancer and to change a destination IP address of the second packet from the IP address of the selected proxy host to the IP address of the first user device to create a changed second packet; and using the selected proxy host to send the changed second packet to the first user device through the network switch and the wide area network.

* * * * *